US008855605B2

(12) United States Patent
Nielsen et al.

(10) Patent No.: US 8,855,605 B2
(45) Date of Patent: Oct. 7, 2014

(54) ASSOCIATING A PARTICULAR ACCOUNT CONFIGURATION DURING THE OUT OF BOX EXPERIENCE FOR A MOBILE DEVICE

(71) Applicant: Dropbox, Inc., San Francisco, CA (US)

(72) Inventors: Lars Fjeldsoe Nielsen, San Francisco, CA (US); Will Stockwell, San Francisco, CA (US); Alex Sydell, San Francisco, CA (US); Tony Grue, San Francisco, CA (US); Kyle Consalus, San Francisco, CA (US); Sujay Jaswa, San Francisco, CA (US); Albert Ni, San Francisco, CA (US)

(73) Assignee: Dropbox Inc., San Francisco, CA (US)

( * ) Notice: Subject to any disclaimer, the term of this patent is extended or adjusted under 35 U.S.C. 154(b) by 0 days.

(21) Appl. No.: 13/923,181

(22) Filed: Jun. 20, 2013

(65) Prior Publication Data

US 2014/0087709 A1      Mar. 27, 2014

Related U.S. Application Data

(60) Provisional application No. 61/705,458, filed on Sep. 25, 2012.

(51) Int. Cl.
*H04M 3/16* (2006.01)
*H04W 4/00* (2009.01)

(52) U.S. Cl.
CPC ................................. *H04W 4/001* (2013.01)
USPC ........ 455/411; 455/410; 455/413; 455/414.1; 455/415; 705/67; 705/72; 705/75; 705/14.53

(58) Field of Classification Search
USPC .............. 455/406–411, 415, 418–420, 435.1, 455/461
See application file for complete search history.

(56) References Cited

U.S. PATENT DOCUMENTS

| 7,305,090 | B1 * | 12/2007 | Hayes et al. | 380/249 |
| 8,107,927 | B2 * | 1/2012 | Sivaram et al. | 455/411 |
| 2002/0147685 | A1 * | 10/2002 | Kwan | 705/44 |
| 2004/0128136 | A1 * | 7/2004 | Irani | 704/270.1 |
| 2007/0299941 | A1 * | 12/2007 | Hietasarka et al. | 709/220 |
| 2009/0008445 | A1 * | 1/2009 | Chen et al. | 235/380 |
| 2009/0280796 | A1 * | 11/2009 | Macaluso | 455/419 |
| 2010/0095357 | A1 * | 4/2010 | Willis et al. | 726/6 |
| 2010/0323664 | A1 * | 12/2010 | Sivaram et al. | 455/411 |
| 2011/0219429 | A1 * | 9/2011 | Lee et al. | 726/3 |
| 2013/0139235 | A1 * | 5/2013 | Counterman | 726/7 |
| 2013/0191926 | A1 * | 7/2013 | Chow et al. | 726/26 |
| 2014/0066023 | A1 * | 3/2014 | Purdy | 455/412.1 |
| 2014/0082363 | A1 * | 3/2014 | Lee et al. | 713/170 |

* cited by examiner

*Primary Examiner* — Dai A Phuong
(74) *Attorney, Agent, or Firm* — Novak Druce Connolly Bove + Quigg LLP (57) ABSTRACT

A method of providing particular account configurations to a user of a mobile device based on a predetermined account configuration offering between a mobile device manufacturer and a third-party service provider based on a code stored on the mobile device. During the out-of-box experience (OOBE) when the user is initially configuring the mobile device, the third-party provider receives user information, a code, and a mobile device identification number. The third-party service provider confirms that the mobile device is eligible for the particular account configuration by using the code and mobile device identification number. Once account configuration eligibility is confirmed, the third-party service provider associates the particular account configuration with either an existing user account or with a new user account established during the OOBE.

21 Claims, 7 Drawing Sheets

ASSOCIATING A PARTICULAR ACCOUNT CONFIGURATION DURING THE OUT OF BOX EXPERIENCE FOR A MOBILE DEVICE

CLAIM OF PRIORITY

This claims the benefit of priority under 35 U.S.C. §119(e) to U.S. Provisional Patent Application No. 61/705,458, filed Sep. 25, 2012.

BACKGROUND

Today's smart mobile devices can, and in some cases do, replace desktop and laptop computers. However, mobile devices have limited storage space for files, photos and videos. As a result, the mobile device hardware limits the user's ability to store files, photos, and videos on the mobile device. In response to this need, some content management services now enable cloud-based cross-platform content synchronization and sharing (e.g., Dropbox™), which enables users to conveniently upload, store, and view files on any device associated with the account.

There are many competing cloud-based services and mobile users are free to download any available third-party application and service. However, users must typically sift through hundreds of applications in an application store to find one that satisfies their needs. Moreover, application and service providers may struggle to differentiate in this highly competitive market.

The present disclosure recognizes and addresses both the foregoing and other considerations of prior art system and methods in providing a solution to the limitations of the prior art.

SUMMARY

A computer-implemented method of associating a configuration with an account for a user by at least one processor, in various embodiments, may include receiving information from a mobile device. This information may include: (a) user information; (b) a mobile device identification number; and (c) a code associated with an account configuration that is preloaded in memory contained within the mobile device prior to the user receiving the device. In response to receiving the information from the mobile device, verifying, using the mobile device identification number and the code, that the mobile device qualifies the user for a particular account configuration. Additionally, in response to verifying that the mobile device qualifies the user for the account configuration, executing a step that is selected from a group consisting of: (a) associating the configuration with an existing user account based on the user information, and (b) establishing a new account for a user associated with the user information and associating the configuration with the new account.

A mobile device, in various embodiments, may include: (1) at least one processor; (2) memory operatively coupled to the at least one processor; and (3) a code stored in the memory. In some embodiments, at least one processor may be configured to, upon initial activation setup of the mobile device, receive information from a user and retrieve the code associated with an account configuration from the memory. Additionally, at least one processor may transmit the information, the code, and a mobile device identification number to a third-party associated with the code. The at least one processor may also receive deal information from the third-party confirming that the mobile device qualifies the user's account for the configuration. In response to receiving the configuration information from the third-party associated with the code, at least one processor may enable setup of a service associated with the account configuration on the mobile device.

BRIEF DESCRIPTION OF THE DRAWINGS

Various embodiments of a computer system for associating particular account configurations for a third-party service during an out of box experience for a mobile device are described below. In the course of this description, reference will be made to the accompanying drawings, which are not necessarily drawn to scale, and wherein.

DETAILED DESCRIPTION

Various embodiments will now be described. It should be understood that the present disclosure may be embodied in many different forms and should not be construed as limited to the embodiments set forth herein. Like numbers refer to like elements throughout.

System Overview

The present disclosure, in accordance with various embodiments, provides a content management server that may receive information from a mobile device during the device's initial activation and setup. In several embodiments, during the device initial setup, the content management server verifies that the user and device qualify for a predetermined account configuration for a third-party service. For example, the content management server may verify that the user and device qualify for an account configuration by: (1) receiving a code and other information and recording it in a log; and (2) processing the log to award the account configuration by verifying other information provided. In various embodiments, the information received by the content management server may include user information, a code preloaded on the mobile device, and a unique mobile device identification number. The content management server may associate the account configuration with an existing user account for the service or with a new user account for the service that is established during setup of the mobile device. It should be understood that a code can take any appropriate form. In various embodiments, the code may be represented by a unique series of numbers and letters, a special type of file (e.g., a Java Archive file), or a calculated hash value based on various collected user data. Additionally, the code may be unique to a specific device or the same for each device manufactured by a particular company. The content management server may determine whether the code is valid for the identified mobile device and user and grant a particular account configuration for the service to the user.

In various embodiments, the account configuration may include granting the user of the mobile device free cloud-based storage space on the content management system.

Cloud-based storage space is advantageous because storage space on mobile devices may be limited. Thus, in some embodiments, from a high level, if the content management server verifies that the device and the user qualify for the free cloud-based storage space, the content management server grants the storage space to the user. More specifically, in various embodiments, an application associated with the content management server is pre-loaded on a mobile device. In several embodiments, when a user is setting up the mobile device, the application "fetches" or accesses a file on the device. The application may then send user information, device information, and an associated code to the content management server. Then, the content management server either associates the granted cloud-based storage space with an existing user account of the user or with a new user account that is created during the setup of the mobile device.

In other embodiments, the content management server may grant a particular account configuration after the user satisfies a predetermined criterion. For example, if the user and the device qualify for the account configuration, then the account configuration is associated with the user account after the user completes a "getting started" tutorial for the content management system. Once the content management server verifies the device and the user information, the content management server sends a notification back to the mobile device to notify the user that they qualify for the particular account configuration.

The present invention is advantageous because the third-party service is integrated into the out-of-box experience for the mobile device. For purposes of this disclosure, the term out-of-box experience (OOBE) is a term that describes the experience that a consumer (or user) has when first performing the initial setup and configuration of a mobile device. Because the third-party service is integrated into the OOBE, the third-party gains an advantage over other application and service providers by getting the user to sign up for, and use, the third-party application and related service.

Exemplary Technical Platforms

The present invention may be, for example, embodied as a computer system, a method, or a computer program product. Accordingly, various embodiments may be entirely hardware, entirely software, or a combination of hardware and software. Furthermore, particular embodiments may take the form of a computer program product stored on a computer-readable storage medium having computer-readable instructions (e.g., software) embodied in the storage medium. Various embodiments may also take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatus (e.g., systems), and computer program products. It should be understood that each element of the block diagrams and flowchart illustrations, and combinations of elements in the block diagrams and flowchart illustrations, respectively, can be implemented by a computer executing computer program instructions. These computer program instructions may be loaded onto a general purpose computer, a special purpose computer, smart mobile device, or other programmable data processing apparatus to produce a machine. As such, the instructions which execute on the general purpose computer, special purpose computer, smart mobile device, or other programmable data processing apparatus create means for implementing the functions specified in the flowchart block or blocks. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, block diagram elements and flowchart illustrations support combinations of mechanisms for performing the specified functions, combinations of steps for performing the specified functions, and program instructions for performing the specified functions. It should also be understood that each block diagram element and flowchart illustration, and combinations of block diagram elements and flowchart illustrations, can be implemented by special purpose hardware-based computer systems that perform the specified functions or steps, or combinations of special purpose hardware and other hardware executing appropriate computer instructions.

Exemplary System Architecture

Figure 1:
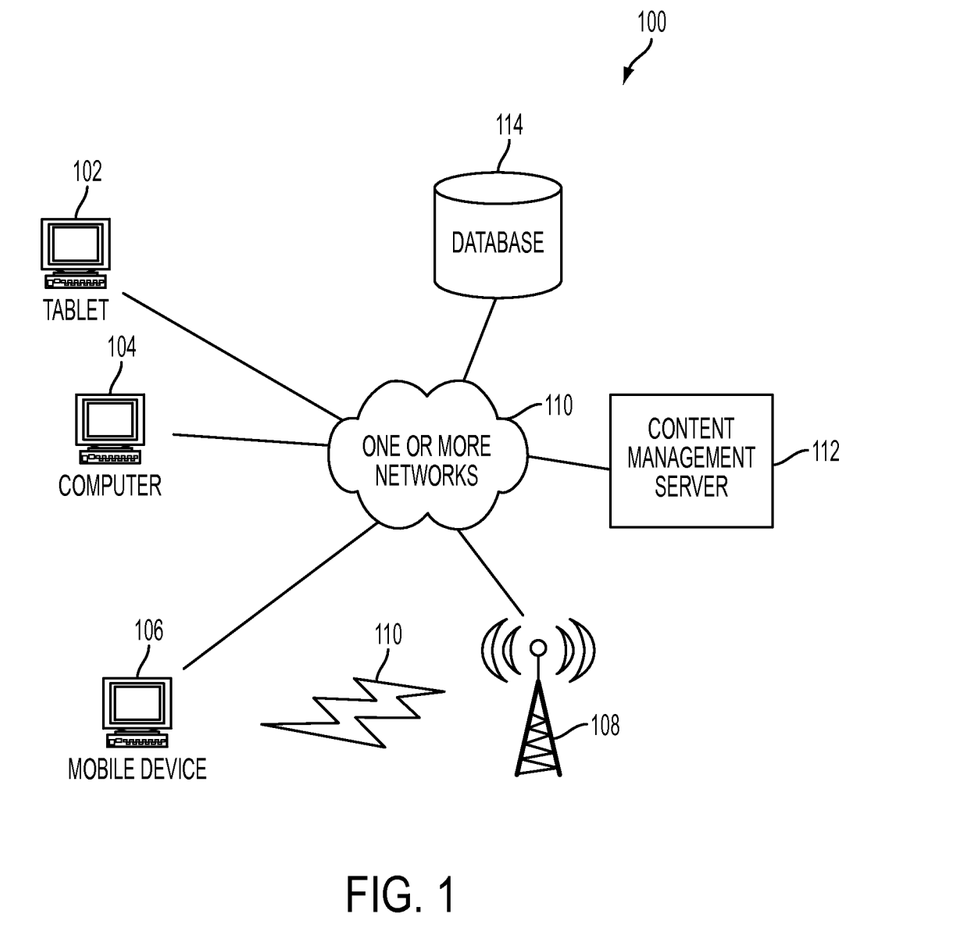
FIG. 1 shows a block diagram of a content management system in accordance with an embodiment of the present system.

FIG. 1 is a block diagram of content management system 100 according to a particular embodiment. As may be understood from this figure, content management system 100 includes remote computing devices such as tablet computer 102, desktop or laptop computer 104, or mobile computing device 106 (e.g., a handheld device, a laptop, a tablet computer, a cellular phone, a smart phone, or any other device capable of transferring files over network 110) that are in communication with content management server 112 (which, for example, may be used to execute one or more modules as described below) and content management database 114 (which, for example, may be used to store the files on the content management system) via one or more networks 110. Networks 110, between content management server 112 and client devices 102, 104, and 106, may be, for example, implemented via one or more wired or wireless networks such as LANs, WANs, a cellular network, a Wi-Fi network, or via the Internet. For purposes of ease of explanation and clarity, no specific cellular network is shown in FIG. 1 as a network for a mobile device. However, a cellular tower may be coupled to a cellular network provider, which may be operatively coupled to network 110. The users of each of tablet computer 102, desktop computer 104, and mobile device 106 may have file storage accounts on content management server 112.

Network 110 may include any of a variety of types of wired or wireless communication networks, such as the Internet. The communication link between content management server 112 and content management database 114 may be, for example, implemented via a LAN, WAN, or via the Internet. Mobile device 106 may transmit data wirelessly over cellular network by communicating with a cellular tower 108. For purposes of ease of explanation and clarity, cellular tower 108 is shown coupled to networks 110. However, the cellular tower may be coupled to a cellular network provider, which is operatively coupled to network 110.

In various embodiments, content management server 112 may include one or more servers that are located in close physical proximity, or some servers may be locally together and others remote. In either case, all devices, wherever located, function as a system.

Content management server 112 enables file access and file storage between content management server 112 and client devices remote computing devices 102, 104, and 106. Content management server 112 receives files from and sends files to remote computing devices 102, 104, 106 consistent with the user's preferences for sharing files. Content management server 112 may act as the counterpart to a client-side file storage service client application user interface that allows a user to manipulate files directly stored on content management server 112. In some embodiments, software operating on remote computing devices 102, 204, 106 integrates network-stored files with the client's local file system to enable a user to manipulate network-stored files through the same user interface (UI) used to manipulate files on the local file system, e.g., via a file explorer, file finder or browser application. As an alternative or supplement to the client-side file explorer interface, content management server 112 may provide a web interface for remote computing devices 102, 104 106 to access (e.g. via a web browser) and allow a user to manipulate files stored on content management server 112. In this way, the user can directly manipulate files stored on content management server 112.

In various embodiments, content management database 114 stores files such as those uploaded using remote computing devices 102, 104, 106. It should be understood that, in various embodiments, content management database 114 may include of multiple data stores—some local to, and some remote from, content management server 112.

Content management database 114 maintains, for each user in a file journal, information identifying the user, information describing the user's file directory, etc. In some embodiments, the file journal is maintained on content management server 112. This file journal may be updated periodically using information obtained directly from content management server 112 and/or from information obtained from one or more client devices 102, 104, and 106 linked to the user's account. In this way, the server-stored file journal (hereinafter the "server-side file journal") is updated when a file is changed either on the server or on one of the client devices associated with the user's account. When a file is changed, content management server 112 propagates the change to each client device associated with the user's account. For example, if a user makes a change to a particular file on a first client device, the change may be reflected in the server-side file journal. The system then uses the server-side file journal to propagate the change to all client devices associated with the user's account. Such techniques may be implemented, for example, within the context of a synchronized file system such as the Dropbox™ Service of Dropbox, Inc. of San Francisco, Calif.

Figure 2:
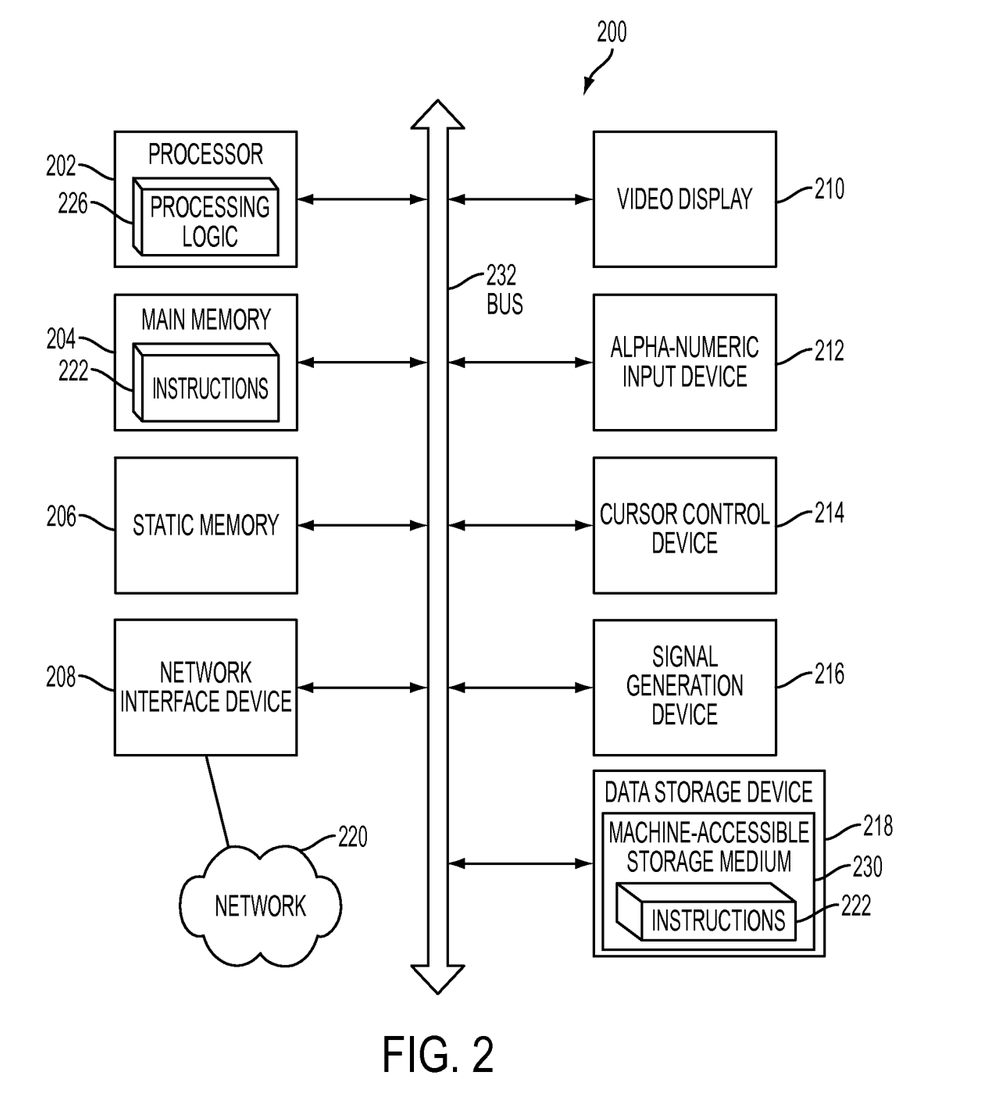
FIG. 2 shows a block diagram of a computer that may be used, for example, as a client or server computer within the context of the content management system of FIG. 1.

FIG. 2 illustrates a diagrammatic representation of computer 200 that can be used within content management system 100, for example, as client computer 102, 104, or 106 (FIG. 1), or as content management server 112 (FIG. 1). For purposes of this disclosure, reference to a server or processor, shall be interpreted to include either a single server, a single processor, or multiple servers, or multiple processors.

In particular embodiments, computer 200 may be connected (e.g., networked) to other computers by a LAN, WAN, an intranet, an extranet, and/or the Internet. Computer 200 may operate in the capacity of a server or a client computer in a client-server network environment, or as a peer computer in a peer-to-peer (or distributed) network environment. Computer 200 may be a personal computer (PC), a tablet PC, a mobile device, a web appliance, a server, a network router, a switch or bridge, or any computer capable of executing a set of instructions (sequential or otherwise) that specify actions to be taken by that computer. Further, while only a single computer is illustrated, the term "computer" may also include any collection of computers that individually or jointly execute a set (or multiple sets) of instructions to perform any one or more of the methodologies discussed herein.

Exemplary computer 200 may include processor 202, main memory 204 (e.g., read-only memory (ROM), flash memory, dynamic random access memory (DRAM) such as synchronous DRAM (SDRAM) or Rambus DRAM (RDRAM), etc.), static memory 206 (e.g., flash memory, static random access memory (SRAM), etc.), and data storage device 218, which communicate with each other via bus 232.

Processor 202 may represent one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 202 may also be one or more special-purpose processing devices such as an application specific integrated circuit (ASIC), a field programmable gate array (FPGA), a digital signal processor (DSP), a network processor, or the like. Processor 202 may be configured to execute processing logic 226 for performing various operations and steps discussed herein.

Computer 200 may further include a network interface device 208. Computer 200 also may include video display 210 (e.g., a liquid crystal display (LCD) or a cathode ray tube (CRT)), alphanumeric input device 212 (e.g., a keyboard), cursor control device 214 (e.g., a mouse), and signal generation device 216 (e.g., a speaker).

Data storage device 218 may include machine accessible storage medium 230 (also known as a non-transitory computer-accessible storage medium, a non-transitory computer-readable storage medium, or a non-transitory computer-readable medium) on which is stored one or more sets of instructions (e.g., a deal verification module, which is configured to carry out the steps illustrated in FIG. 3 or a software initiation module, which is configured to carry out the steps illustrated in FIG. 4) embodying any one or more of the methodologies or functions described herein. The deal verification module may also reside, completely or at least partially, within main memory 204 and/or within processing device 202 during execution thereof by computer 200, main memory 204, and processing device 202 also constituting computer-accessible storage media. Instructions 222 (e.g., file organizing module 29) may further be transmitted or received over network 220 via network interface device 208.

While machine-accessible storage medium 230 is shown in an exemplary embodiment to be a single medium, the term "machine-accessible storage medium" should be understood to include a single medium or multiple media (e.g., a centralized or distributed database, and/or associated caches and servers) that store the one or more sets of instructions. The term "machine-accessible storage medium" shall also be understood to include any medium that is capable of storing, encoding, or carrying a set of instructions for execution by the computer and that cause the computer to perform any one or more of the methodologies of the present invention. The term "computer-accessible storage medium" shall accordingly be understood to include, but not be limited to, solid-state memories, optical, and magnetic media.

Exemplary System Operation

Figure 3:
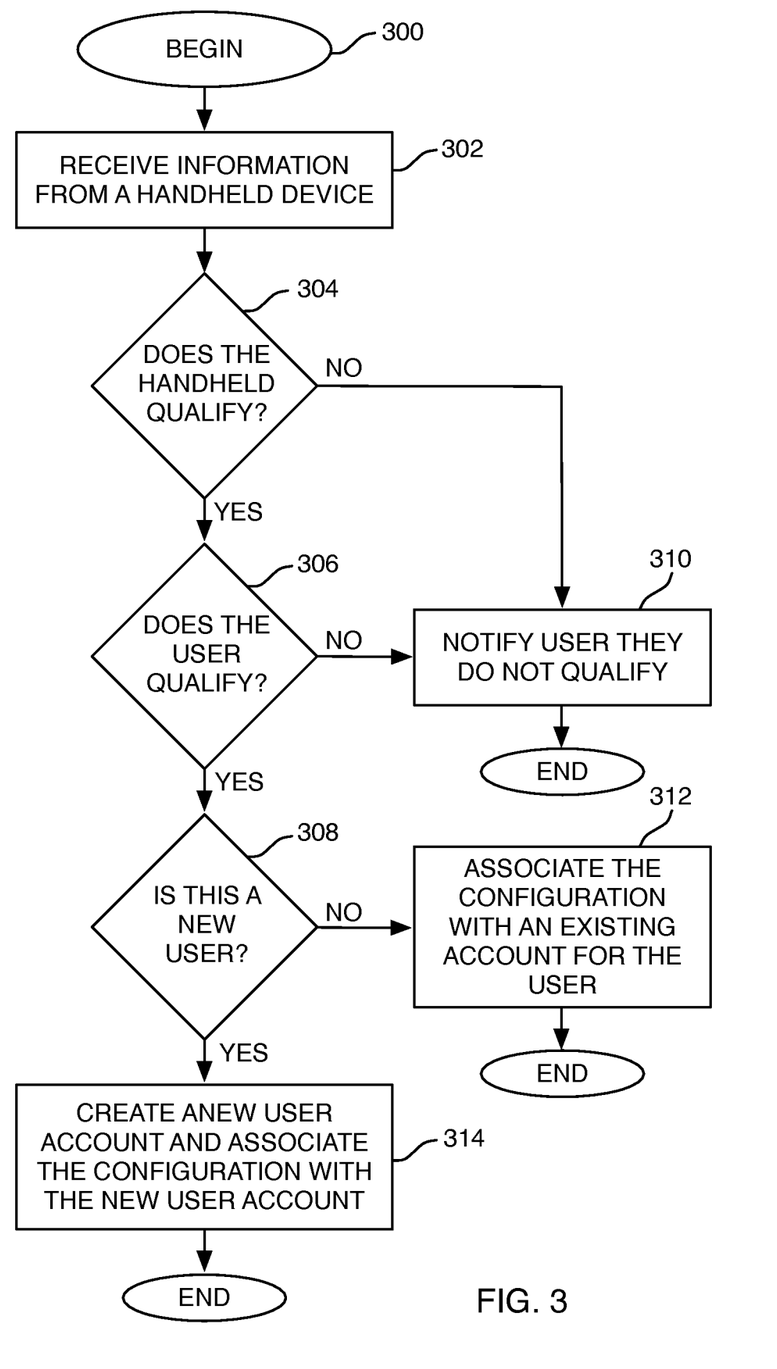
FIGS. 3-4 show flow diagrams that generally illustrate various steps executed by a file sharing system in accordance with various embodiments of the present system of FIG. 1.
Figure 4:
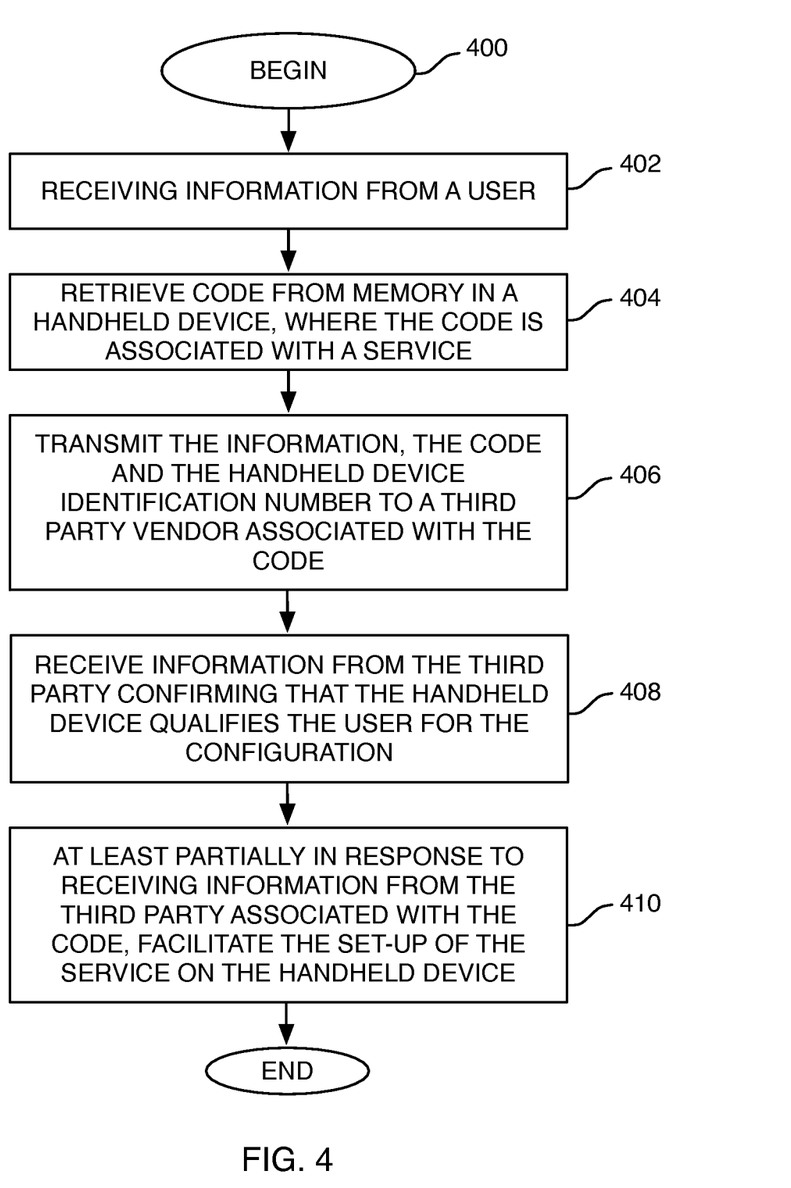

Devices 102, 104, 106 and content management server 112 may alone, or in combination, perform the method steps of FIGS. 3 and 4. It should be understood by reference to this disclosure that these methods describe exemplary embodiments of the method steps carried out by the present system, and that other exemplary embodiments may be created by adding other steps or by removing one or more of the method steps described in FIGS. 3-4.

FIG. 3 shows the steps provided by exemplary verification module 300 for determining whether a new or inactivated mobile device and user of such device are eligible for a particular account configuration with a third-party service provider. Beginning at step 302, the content management server may receive information from a mobile device, which may be transmitted over a cellular connection or over a Wi-Fi connection that may be established during the setup of the mobile device. The information sent to the content management server may be sent in response to the user entering the information during the setup of the mobile device. In various embodiments, the information may contain: (1) user information; (2) a code that is preloaded on the mobile device by the manufacturer of the mobile device or by a wireless carrier associated with the mobile device; and (3) a unique mobile device identification number.

In some embodiments, the user information may include a username and password. The username may be, for example, an e-mail address or any suitable username accepted by the third-party service provider (e.g., the content management server of a content management system). In various embodiments, the unique mobile device identification number may be the electronic serial number for the mobile device. In other embodiments, the mobile identification number may be any other suitable identifier that allows the content management system to track an individual mobile device.

In various embodiments, the code may be a unique code associated with the manufacturer and model of the mobile device. That is, the same code may be used on all like models of the mobile device. In other embodiments, the code may be associated with the wireless carrier that provides cellular service to the mobile device. As discussed above the code may be preloaded onto the mobile device prior to the mobile device being shipped to the retail seller (e.g., by the manufacturer or other intermediary). The code may be stored in the mobile device memory in a file such as a Java Archive file. In various embodiments, the code may be encrypted to help prevent unauthorized use of the code.

Once the content management server 112 receives the information from the mobile device, in response to receiving the information, at step 304, the content management server may verify that the mobile device qualifies the user for the account configuration. In various embodiments, the account configuration may relate to a third-party service that is provided to the user of the mobile device. Thus, based on the information received from the mobile device, the content management server, in various embodiments, may confirm that: (1) the code on the mobile device qualifies the user for a particular account configuration; (2) that the particular account configuration was not already granted to another user of the mobile device; (3) and in some embodiments, that the user has satisfied at least one criterion. The criterion may be, for example, the completion of a tutorial on the third-party service.

At step 304, content management server 112 may determine whether the mobile device qualifies for the account configuration based on the code (e.g., is the code being used on a qualified mobile device) and the mobile device identification. If the mobile device qualifies for the account configuration, then at step 306, the content management server may determine whether the user associated with the mobile device qualifies for the account configuration. In various embodiments, a device may qualify for the account configuration if the device manufacturer predetermines an account configuration with the third-party vendor providing the content management system services. If, on the other hand, the mobile device does not qualify for the account configuration (e.g., the code is not being used on a qualified mobile device), at step 310, the content management server may notify the user that they do not qualify for the particular account configuration.

At step 306, content management server 112 also may determine if the user qualifies for the account configuration. If the user does not qualify for the account configuration, the content management server moves to step 310 and notifies the user that they do not qualify for the account configuration. In various embodiments, a user may not qualify for a particular account configuration, even though the mobile device does qualify for the particular account configuration. This may happen, for example, if the user previously was granted the particular account configuration on another qualifying mobile device.

Figure 9:
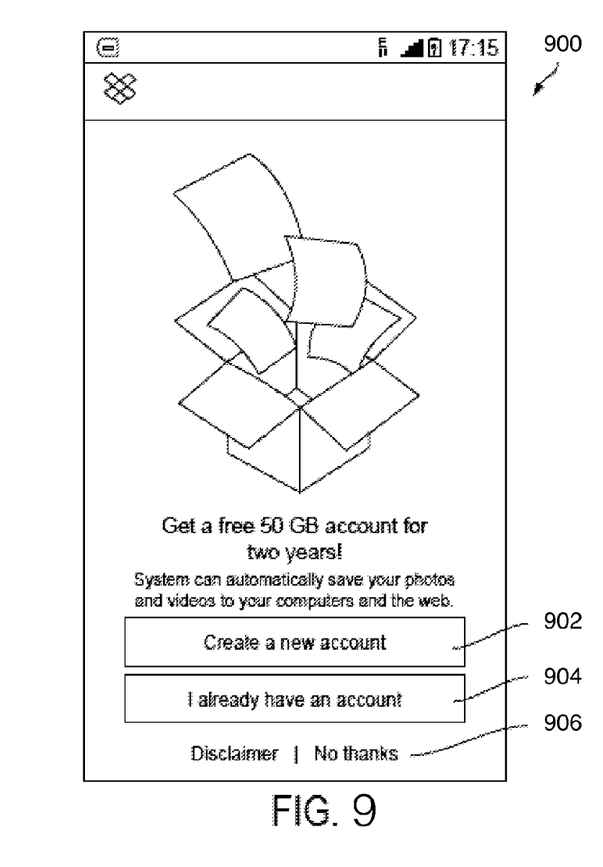

If, on the other hand, the user qualifies for the account configuration, then at step 308, the content management server may determine if the user is new to the content management system or has an existing account on the content management system. In various embodiments, the user can indicate if they are an existing or new user when setting up the mobile device. For example, the third-party service screen in the OOBE may allow the user to select "I already have an account" menu item 904 (FIG. 9) or "Create a new content management service account" menu item 902 (FIG. 9). As such, in various embodiments, the user information received by the content management server may contain an indication whether the user is a new or an existing user to the content management system. If the user is setting up a new account, the content management server, at step 314, may create the new account and associates the particular account configuration with the new user account. Otherwise, at step 312, the content management server may log the user into their existing account and associates the particular account configuration with the user's existing account.

In various embodiments wherein the particular account configuration is not associated with the user's account, the content management server may associate the device with either a new or existing account for the user even though the user does not qualify for the deal. In this way, the user may receive the standard account configuration, but gain the benefit of using the content management services with the mobile device.

In various embodiments, the user information, code, and mobile device identification number may be stored in content management database 114. Alternatively, the particular account configuration associated with the user's account can also be stored in content management database 114. This way, content management server 112 can manage the user's account with respect to the particular account configuration granted to the user. For example, in some embodiments, the particular account configuration may grant the user a predetermined amount of free storage space on a synched content management system for a fixed length of service. Content management server 112 may use the stored information to manage the user's account and provide renewal notice when the fixed length of service expires. The user and device information stored in content management database 114 may allow content management server 112 to sync file data among different client devices associated with the user's account.

FIG. 4 shows a method, in accordance with various embodiments of a mobile device, of associating an account configuration with the account of a user of the mobile device. Beginning at step 400, mobile device 106 (FIG. 1) may receive information from user 402. The information may be received during the initial setup of the mobile device. In particular, one or more screens in the mobile device OOBE may present the user of the mobile device with the opportunity to initiate a third-party service on the mobile device. For example, in one embodiment, the third-party service may be a cloud-based content management service where photos, files, and videos are stored by the third-party content management server and are made available to the user of the mobile device. This way, the files, photos, and videos may not deplete the memory on the mobile device and may be downloaded in real time when the user wants to view or edit a file.

At step 404, in response to receiving the information from the user, the mobile device may retrieve a code from memory in the mobile device. The code may be included in a file stored on the mobile device. For example, in various embodiments, the code may be stored within a Java Archive file. The code may be a unique code that associates particular account configurations with a particular mobile device model or wireless carrier. As such, in various embodiments, the third-party service provider may predetermine certain account configurations with a mobile device manufacturer and/or wireless carrier. In exchange for providing advantageous account configurations to the mobile device user, in various embodiments, the manufacturer may integrate the third-party service provider application and service setup screens into the mobile device OOBE.

At step 406, the mobile device may transmit the user information, the code and a mobile device identification number to a third-party service provider associated with the code. At step 408, the mobile device may receive information from the third-party confirming that the mobile device qualifies for the account configuration. At step 410, in response to receiving information from the third-party associated with the code, the mobile device may enable the setup of the service (for example, synching data on a content management system or auto-populating photo gallery views on the mobile device) on the mobile device.

In various embodiments, the code may be associated with the provision of free cloud-based storage space on a content management system. In some embodiments, the content management system may be a synched content management system. In still other embodiments, the service on the mobile device may automatically populate a photo gallery view on the mobile device or automatically uploads files from the mobile device to the content management system once the service is setup on the mobile device.

Example User Experience

When a user purchases a mobile device, in most cases, the user must setup the mobile device prior to using the device, which is performed by the user through the mobile device's OOBE. Setup is performed by navigating through one or more setup screens that allows a user to select options to customize the mobile device to their liking. The following discussion is directed to various embodiments of an OOBE that the user may experience when setting up their mobile device.

Figure 5:
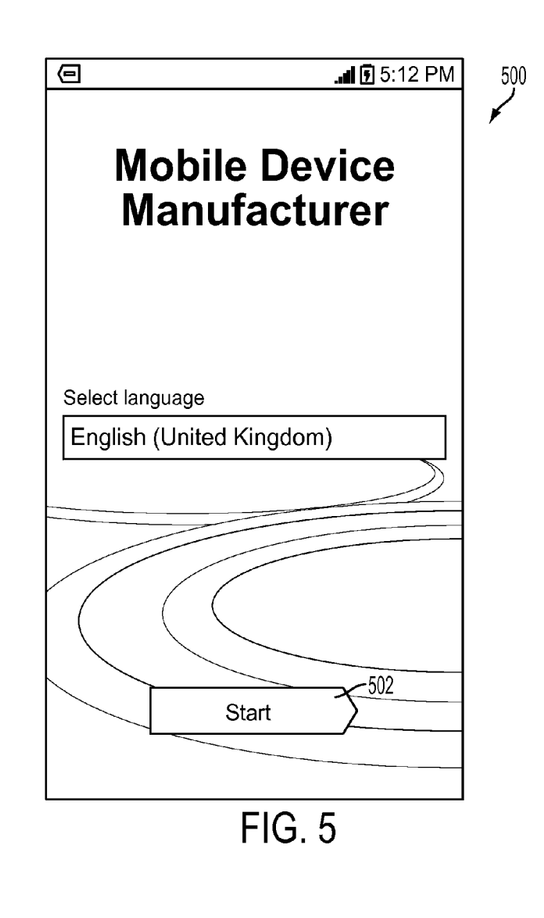
FIGS. 5-10 show screen shots from a mobile device that illustrate the user experience associated with setting up a mobile device in accordance with an embodiment of the present system and method.
Figure 6:
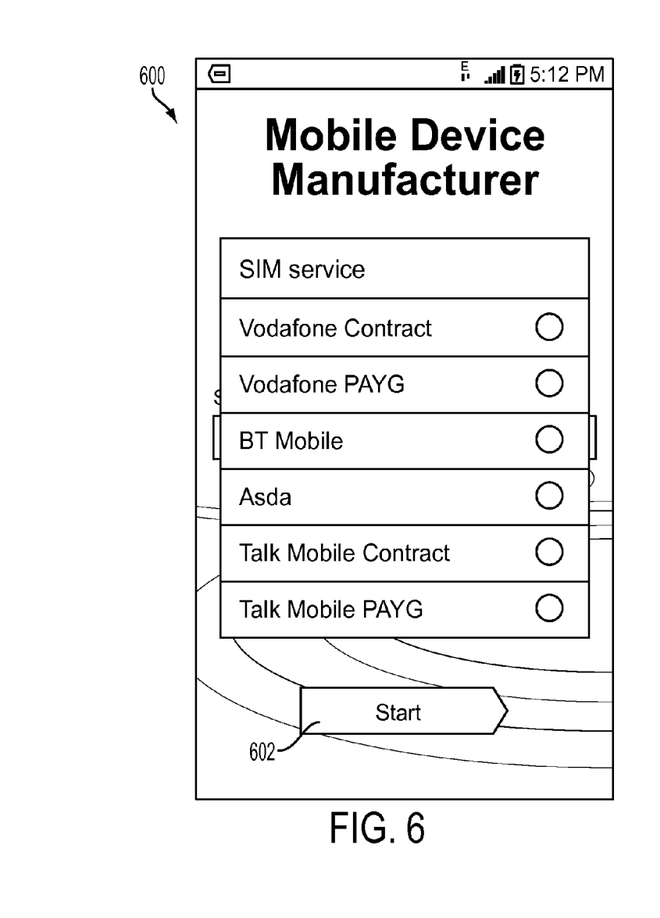

Referring to FIG. 5, when the user powers on the mobile device for the first time, the mobile device may present the user with welcome screen 500. The user may select their local language and select "start" menu item 502 to advance to the next screen. Referring to FIG. 6, in some embodiments, the user may also select the mobile network on "Sim service" screen 600. Once the user selects the mobile network provider, they may select "start" menu item 602 to continue the setup process.

Figure 7:
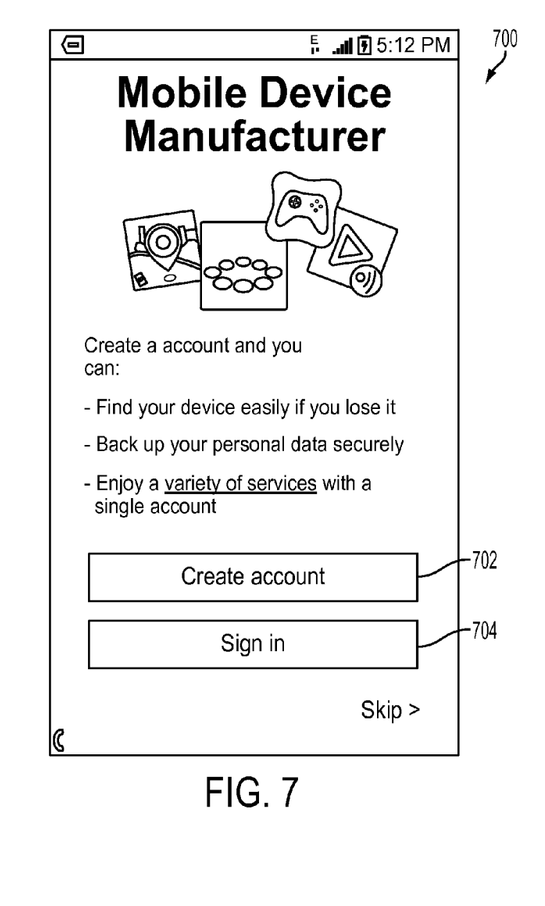
Figure 8:
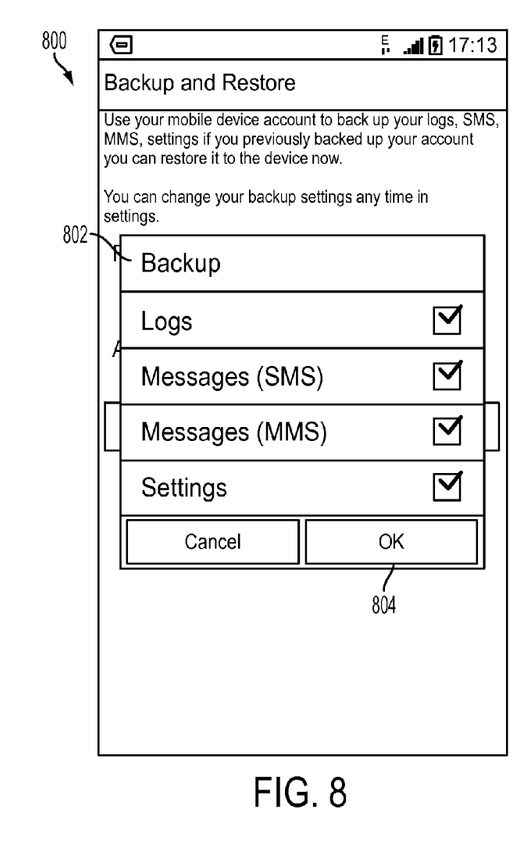

Referring to FIG. 7, the mobile device presents the user with device manufacturer account screen 700 that may allow the user to associate the mobile device with an account hosted by the mobile device manufacturer. In the example shown, the user may either set up an account with a mobile device manufacturer by clicking "create account" menu item 702, or log into an existing mobile device manufacturer account by selecting "sign in" menu item 704. The user may already have a mobile device manufacturer account if they have previously owned a mobile device manufactured by the same company. Referring to FIG. 8, once the user logs into an existing account or creates a new account, backup screen 800 may be displayed that allows the user to backup and restore SMS messages, call logs, and certain settings by selecting items on "backup" screen 802. Thus, if the user has to reset the mobile device for any reason, or if the user buys a new mobile device, the user can restore saved information to the new device, or the reset old device. Once the user selects their backup settings, the user may hit "ok" menu item 804 to advance to the next screen.

In various embodiments, the OOBE may be configured to present the user with the ability to associate the mobile device with a third-party service provider. In particular, and referring to FIG. 9, content management service screen 900 presents the user with an account configuration that relates to the provision of a predetermined configuration package, such as free cloud-based storage space with an account on a synched content management system (e.g., Dropbox, Inc.). In the current example, the manufacturer of the mobile device negotiated an account configuration with content management service to provide the user with 50 free GB of cloud storage on the content management service synched content management system. To take advantage of this configuration, screen 900 provides the user with an option to create a new account by selecting "Create a new content management service account" menu item 902 or to log into an existing content management service account by selecting "I already have an account" menu item 904. The user may also select "No thanks" menu item 906, which allows the user to skip over the account configuration offering. However, if the user selects "No thanks" menu item 906, they can later return to this menu option to take advantage of the account configuration offering. If the user already has a content management service account, the content management service system will associate the account configuration with the user's existing account. Associating the mobile device with a content management service account allows the user to store data files, including photos and video in their cloud-based storage account. In this way, the user can maximize the amount of local memory that is available to the user while maintaining the ability to view and download content as needed.

Figure 10:
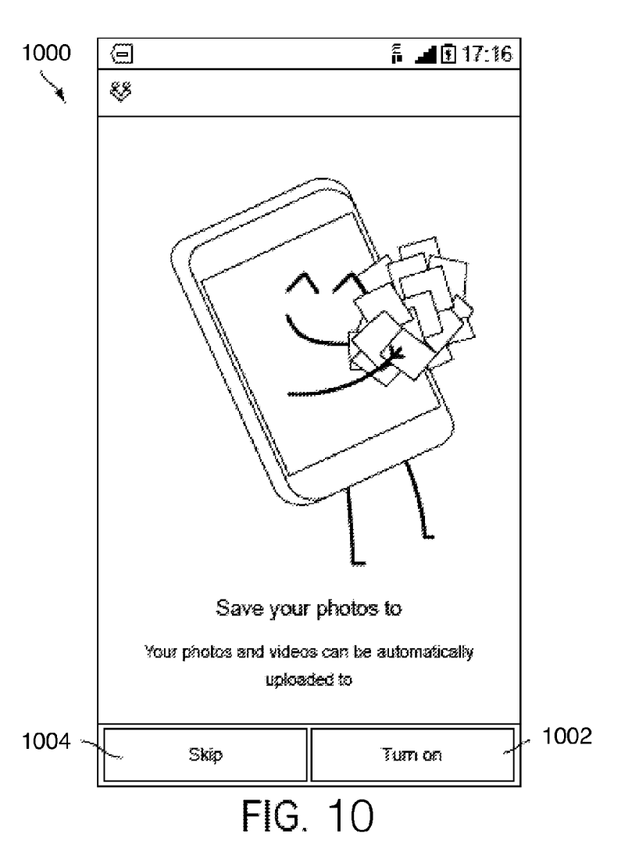

Once the user is finished creating a new content management service account or logging in to their existing account, referring to FIG. 10, the OOBE presents the user with camera upload screen 1000 that allows user enable an automatic photo upload feature by selecting "Turn on" menu item 1002. If the user does not wish to enable the photo upload feature, they can select "Skip" menu item 1004 to advance to the next screen. The camera upload feature allows the mobile device to automatically send photos, videos, and screenshots taken on the mobile device to a private folder in the user's content management service account.

One of skill in the art, with reference to this disclosure, should understand that various other OOBE screens may be included in the setup and initialization of the mobile device.

CONCLUSION

Having the benefit of the teachings presented in the foregoing descriptions and associated drawings, one of skill in the art will recognize many modifications and other embodiments of the invention.

In light of the above, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed:

1. A computer-implemented method of associating an account configuration with an account for a user by at least one processor, comprising the steps of:
    receiving information from a mobile device, wherein the information comprises:
        user information received from a user;
        a mobile device identification number; and
        a code that is preloaded in memory contained within the mobile device prior to the user receiving the device,
    in response to receiving the information from the mobile device, verifying, using the mobile device identification number and the code, that the mobile device qualifies the user for an account configuration; and
    in response to verifying that the mobile device qualifies the user for the account configuration, determining whether the user is new or existing, then executing a step that is selected from a group consisting of:
        associating the account configuration with an existing user account based on the user information, and
        establishing a new account for a user associated with the user information and associating the account configuration with the new account.

2. The computer-implemented method of claim 1, wherein the user information further comprises a username and a password.

3. The computer-implemented method of claim 1, wherein the mobile device identification number is unique to the mobile device.

4. The computer-implemented method of claim 1, further comprising the step of sending a notification to the user of the mobile device that at least one criterion must be satisfied prior to receiving the account configuration.

5. The computer-implemented method of claim 1, wherein the account is an account on a synched content management system.

6. The computer-implemented method of claim 1, wherein the code is included in a file that is preloaded on the mobile device before the mobile device is shipped to the user.

7. The computer-implemented method of claim 6, wherein the file is a Java Archive file.

8. The computer-implemented method of claim 1, wherein the account configuration is associated with free cloud-based storage space.

9. The computer-implemented method of claim 8, wherein the free cloud-based storage space is provided to the user for a fixed period of time.

10. The computer-implemented method of claim 1, further comprising:
    confirming if the user has satisfied at least one criterion; and
    a step selected from the group consisting of:
        providing the account configuration to the user if the at least one criterion has been satisfied, and
        sending notification to the user that the at least one criterion must be satisfied prior to providing the account configuration to the user.

11. A mobile device comprising:
    at least one processor;
    memory operatively coupled to the at least one processor;
    a code stored in the memory;
    wherein the at least one processor is configured to, upon initial activation setup of the mobile device:
        receive information from a user;
        retrieve the code associated with a service from the memory;
        transmit the information, the code and a mobile device identification number to a third-party associated with the code;
        receive account configuration information from the third-party confirming that the mobile device qualifies the user for a particular account configuration; and
        in response to receiving the account configuration information from the third-party associated with the code, enable setup of the service on the mobile device where the account configuration is associated with an existing account or the account configuration is associated with a new account based on whether the user is determined to be a new user or an existing user.

12. The mobile device of claim 11, wherein the code is contained in a Java Archive file.

13. The mobile device of claim 11, wherein the information comprises a username and a password.

14. The mobile device of claim 11, wherein the code is associated with free cloud-based storage space.

15. The mobile device of claim 11, wherein the at least one processor is further configured to automatically populate information on the mobile device once the service is set-up.

16. The mobile device of claim 11, wherein the code is retrieved in response to receiving the information from the user.

17. The mobile device of claim 11, wherein the mobile device is a handheld device.

18. A system, comprising at least one processor configured to provide a user of a mobile device a particular account configuration for a service based on a code stored on the mobile device and in context of the user initially setting up the mobile device, comprising:
    receiving information from the mobile device when the user is initially setting up the mobile device, wherein the information comprises:
        a mobile device identification number;
        user information received from a user; and
        the code;
    in response to receiving the information from the mobile device, confirming, using the information, that the user of the mobile device is eligible for the particular account configuration for the service;

in response to confirming that the user is eligible for the particular account configuration, determining whether the user is new or existing; and executing a step that is selected from a group consisting of:
- associating the particular account configuration with an existing user account based on the user information, and
- establishing a new account for the user associated with the user information and associating the particular account configuration with the new account.

19. The system of claim 18, wherein the account is an account on a synched content management system.

20. The system of claim 18, wherein the code is included in a file that is preloaded on the mobile device prior to the mobile device being provided to the user.

21. The system of claim 19, wherein the particular account configuration is associated with free cloud-based storage space on the synched content management system.

* * * * *